Dec. 11, 1951     W. N. GITTINGS     2,578,419
ECCENTRIC MAGNETIC SUSPENSION
Filed April 11, 1950
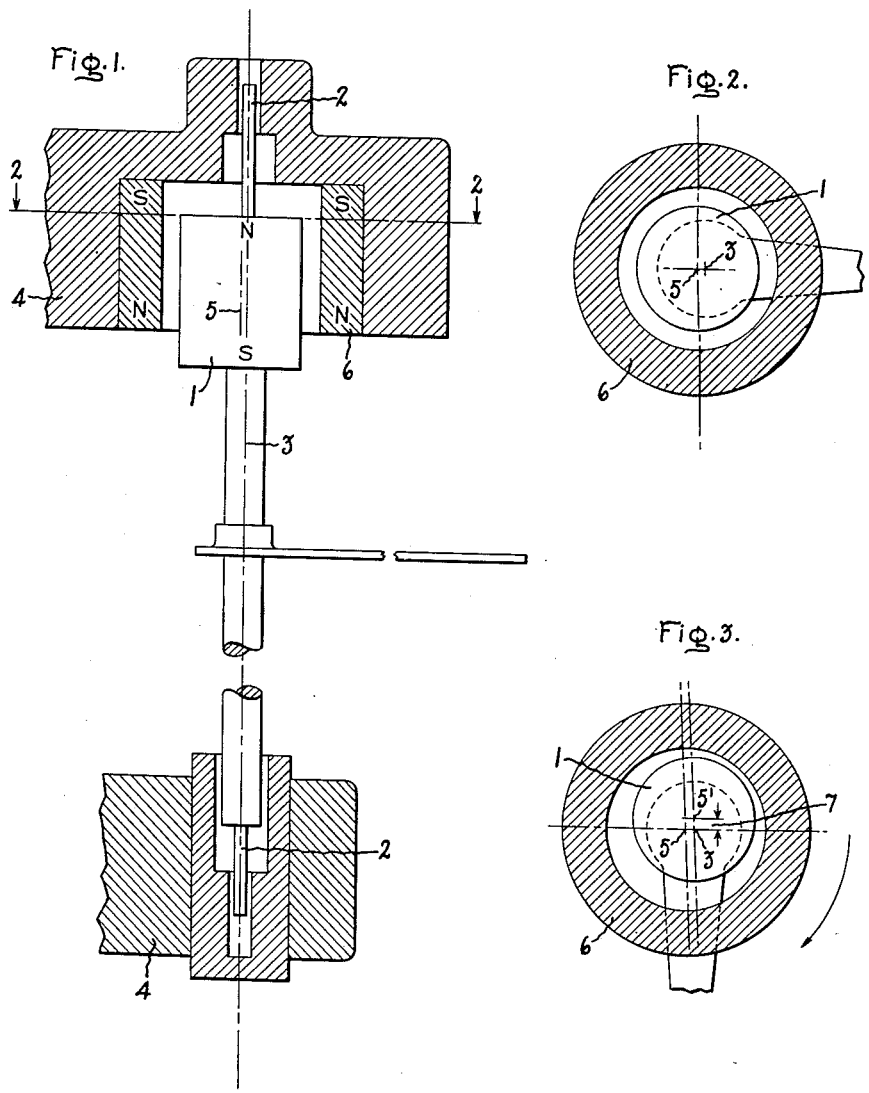
Inventor:
William N. Gittings,
by Ernest C. Britton
His Attorney.

Patented Dec. 11, 1951

2,578,419

UNITED STATES PATENT OFFICE 2,578,419

ECCENTRIC MAGNETIC SUSPENSION

William N. Gittings, Oakmont, Pa., assignor to General Electric Company, a corporation of New York Application April 11, 1950, Serial No. 155,247

3 Claims. (Cl. 175—336)

My invention relates to relays and electric meters having a rotor supported by magnetic suspension and has for an object the provision of an improved eccentric magnetic mounting of a rotor and a stator having a definite position of minimum reluctance and requiring no external device to provide a torque for restoring said rotor to said definite position.

A further object of my invention is to provide an improved double eccentric pivot axis with respect to both a magnetic stator and a magnetic rotor for a relay or an electric meter to apply a magnetic restraining torque opposing any operating torque applied to move the rotor from the position of maximum eccentricity while also providing a magnetic suspension for the rotor.

The usual method of magnetic suspension includes a hollow cylindrical magnetic stator mounted in a support with its axis vertical. A coaxial cylindrical magnetic rotor is mounted within the stator between axial pins journalled in the support. The stator and the rotor are magnetized axially and oppositely to produce mutual attractions at both ends of the stator and rotor. The rotor is free to move axially so that it assumes the vertical position in which the vertical components of the attractive forces at the ends of the stator are sufficient to sustain the weight of the stator. Since the centers of magnetism of the stator and the rotor are coincident with the axis of rotation external magnetic means must be employed to provide both the restraining and the restoring torques of the rotor.

According to my invention the rotor of a magnetic suspension device is pivoted upon an axis parallel to and spaced from the principal axes of configuration of both the rotor and the stator so that the rotor becomes magnetically biased to a predetermined position of minimum reluctance within the stator by the torque comprising the forces between the magnets acting upon a lever arm equal to the eccentricity of the pivot axis and tending to restore the rotor to the predetermined position. This biasing torque also acts against operating torque applied to the rotor as a retarding torque. Thus the need for separate position restoring and retarding torque producing devices is eliminated.

For a better understanding of my invention reference is made to the accompanying drawing of one embodiment of my invention of which Fig. 1 is a vertical section through the center line; Fig. 2 is a sectional view along the line 2—2 of Fig. 1 looking in the direction of the arrows; Fig. 3 is similar to Fig. 2 with rotor 1 rotated 90° clockwise.

According to the drawing a cylindrical magnetic rotor 1 is pivoted upon a pair of pins 2 journalled in a support 4 and having a pivot axis 3 eccentric to rotor 1. Rotor 1 is free to move axially. In Figs. 1 and 2, axis 5 is the center of configuration of the cylindrical bore of a cylindrical magnetic stator 6 mounted upon support 4 and axis 5' is the center or principal axis of configuration of the rotor 1. Rotor 1 and stator 6 are axially and oppositely magnetized to provide support for rotor 1. The attractive force between magnetized rotor 1 and stator 6 support rotor 1 within stator 6. The position of maximum reluctance of rotor 1 within stator 6 is that shown in Fig. 2 in which the principal axes of configuration of stator 6 and rotor 1 are substantially coincident at 5.

When rotor 1 is rotated from the dead center position shown in Fig. 2, for example as in Fig. 3, the principal axis of configuration of rotor 1 occupies a position such as 5' so that when the rotor is released the magnetic force between rotor 1 and stator 6 acting at the lever arm 7 (the distance between 3 and 5') provides a restoring torque to move rotor 1 to the predetermined position of minimum reluctance wherein the axis 5' of configuration of rotor 1 will be on the opposite side of the pivot axis 3 from the axis 5 of configuration of the stator 6.

Since the magnetic force between the stator and rotor and the lever arm are constant, the restoring torque is a restraining torque opposing any operating torque applied to rotate rotor 1 from such minimum reluctance position which is also the position of maximum eccentricity of the rotor with respect to the stator.

While the present invention has been described by reference to a particular embodiment thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. A magnetic device comprising a cylindrical magnetic stator having a concentric cylindrical bore, a cylindrical magnetic rotor movable eccentrically within said bore, said rotor being rotatable about a pivot axis parallel to and spaced from both the axis of configuration of said bore and the axis of configuration of said rotor, said rotor and said stator being axially and oppositely magnetized, whereby the magnetic force between said rotor and said stator combining with the double eccentricity of said pivot axis from said rotor and stator configuration axes provides a restoring torque to bias said rotor towards a position of minimum reluctance between said rotor and said stator in which said rotor and said stator are substantially in a position of maximum eccentricity.

2. A magnetic device having a support, a cylindrical magnetic stator mounted upon said support and having a concentric bore, a cylindrical magnetic rotor movable eccentrically within said stator and pivoted upon said support about an axis parallel to and spaced from both the axis of configuration of said bore and the axis of configuration of said rotor, said stator and said rotor being axially and oppositely magnetized whereby the magnetic force therebetween supports the weight of said rotor and together with the double eccentricity of said pivot axis provides a restoring torque upon rotation of the rotor in either direction from the position of maximum eccentricity thereof.

3. A magnetic device comprising a support, a cylindrical magnetic stator mounted upon said support and provided with a concentric cylindrical bore, a cylindrical magnetic rotor positioned within said bore, pins mounted upon the ends of said rotor and centered upon a pivot axis parallel to and spaced from the principal axis of configuration of both the rotor and the bore, said pins being transversely journalled in said support, said stator and said rotor being axially and oppositely magnetized to support the weight of said rotor, whereby the magnetic force between said stator and said rotor from said magnetization and the eccentricity of said pivot axis from the axes of configuration of both said rotor and said bore provide a torque opposing any operating torque applied to move said rotor from the position of minimum reluctance thereof.

WILLIAM N. GITTINGS.

REFERENCES CITED

The following references are of record in the file of this patent:

UNITED STATES PATENTS

| Number | Name | Date |
|---|---|---|
| 588,666 | Stanley | Aug. 24, 1897 |
| 1,818,170 | Stalder | Aug. 11, 1931 |
| 2,311,382 | Hansen | Feb. 16, 1943 |
| 2,333,647 | Green | Nov. 9, 1943 |
| 2,367,299 | McLarn et al. | Jan. 16, 1945 |

OTHER REFERENCES

AIEE Transactions, vol. 67, part II, pages 1180 to 1185. This is a reprint of AIEE Technical Paper 48-210 dated July 1948.